(12) United States Patent
Jirele

(10) Patent No.: US 6,266,912 B1
(45) Date of Patent: Jul. 31, 2001

(54) DECOY MOUNTING MOTION AND STAKING DEVICE3

(76) Inventor: Allan D. Jirele, 27607 Thompson Bay Rd., Webster, WI (US) 54893

( * ) Notice: Subject to any disclaimer, the term of this patent is extended or adjusted under 35 U.S.C. 154(b) by 0 days.

(21) Appl. No.: 09/534,598

(22) Filed: Mar. 27, 2000

Related U.S. Application Data

(63) Continuation-in-part of application No. 09/256,674, filed on Feb. 22, 1999.

(51) Int. Cl.$^7$ .................................................. A01M 31/06
(52) U.S. Cl. ............................................. 43/2; 43/3
(58) Field of Search ........................... 43/2, 3; 248/156, 248/507, 508; 135/118; 52/153, 155, 156, 166

(56) References Cited

U.S. PATENT DOCUMENTS

| | | | |
|---|---|---|---|
| 836,823 | * 11/1906 | Oliver et al. | 43/3 |
| 1,316,566 | * 9/1919 | Fauble | 43/3 |
| 1,879,991 | * 9/1932 | Pratt | 43/3 |
| 1,933,844 | * 11/1933 | Davis | 43/3 |
| 2,439,167 | * 4/1948 | Jackson | 43/3 |
| 2,502,807 | * 4/1950 | Temmer | 248/156 |
| 3,222,874 | * 12/1965 | Zink | 52/155 |
| 3,245,168 | * 4/1966 | Pool | 43/3 |
| 3,283,733 | * 11/1966 | Boerma | 248/156 |
| 3,288,159 | * 11/1966 | Corliss | 135/118 |
| 3,800,457 | * 4/1974 | Barrett | 43/3 |
| 4,651,457 | * 3/1987 | Nelson et al. | 43/3 |
| 4,689,913 | * 9/1987 | Brice | 43/3 |
| 4,893,428 | * 1/1990 | Gagnon, Sr. | 43/3 |
| 4,928,418 | * 5/1990 | Stelly | 43/3 |
| 5,040,924 | * 8/1991 | Kothman | 52/155 |
| 5,245,715 | * 9/1993 | Dinkins | 248/508 |
| 5,322,386 | * 6/1994 | Trangsrud | 52/155 |
| 5,392,554 | * 2/1995 | Farstad et al. | 43/3 |
| 5,787,632 | * 8/1998 | Kraut | 43/2 |

* cited by examiner

Primary Examiner—Darren W. Ark

(57) ABSTRACT

A mounting, motion, and staking device for half-shell type decoys, which, during periods when horizontal forces are absent, allows the mounted decoy to assume an initial at-rest facing direction and position as selected by the user due to operative gravitational forces, and which further allows the mounted decoy to rotate on a bearing ledge in response to natural, manual, or mechanical horizontal force, and which further allows the mounted decoy to rotate in a reverse manner, returning to its at-rest position and facing direction when such horizontal force has been reduced or eliminated, such force causing the reverse rotational movement being gravity.

2 Claims, 3 Drawing Sheets

DECOY MOUNTING MOTION AND STAKING DEVICE3

This application is a CIP of Ser. No. 09/256,674 Feb. 22, 1999.

BACKGROUND OF THE INVENTION

The present invention relates, but is not limited to, the use of half shell duck, goose, turkey, or other fowl decoys on land. More specifically, the present invention relates to the activation of virtually all half shell decoys for which mounting, motion, and staking systems are rarely supplied using the device now presented.

Decoys have been used to lure quarry for centuries. In recent decades, a number of patents have been granted for moveable, pivotal, self-aligning fowl decoys, and various stake mounting devices. Of those referenced above, the "Self-Heading Wild Fowl Decoys" of Barrett, U.S. Pat. No. 3,800,457, the "Self-Aligning Decoy" of Gagnon, Sr., U.S. Pat. No. 4,893,428, and the "Mounting Assembly for Decoys" of Farstad, U.S. Pat. No. 5,392,554 are most notable, yet quite complex and have proven impractical for mass production. None of the patents so noted, nor any of those referenced, offers such an economical and simple, yet unique, method for the utilization of natural forces, gravity and wind, while allowing for the use of other forces as well, both manual or mechanical, in the activation of the mounted decoy, as that now offered with the present invention. Additionally, nothing has been discovered which resembles the device herein presented, a device which converts gravitational forces exerted on the mounted decoy into horizontal rotational movement of the mounted decoy.

BRIEF SUMMARY OF THE INVENTION

The principle object of the present invention is to provide a mounting, motion, and staking device for use with virtually all half shell type fowl decoys, a device which allows the user to determine the at rest facing direction of the decoy so mounted thereon, and which further allows the mounted decoy to rotate thereon in response to horizontal and gravitational forces applied thereto.

The object is accomplished in the present invention inasmuch as absent any horizontal force, the force of gravity causes the mounted decoy assembly to always assume a predetermined at rest facing direction and position as selected by the user, while yet allowing the mounted decoy to rotate in response to horizontal forces when such forces are sufficient to overcome the gravitational forces always present, and further allowing it to return to its at rest position when such horizontal forces are reduced or eliminated.

A final object of the present invention is to provide a mounting, motion, and staking device which has simplified and universal application for virtually all half shell type decoys. This object has been accomplished inasmuch as all such known decoys can be mounted to this device herein presented and can fully benefit from all of its mounting, pivoting, and staking features.

DETAILED DESCRIPTION

Figure 1:
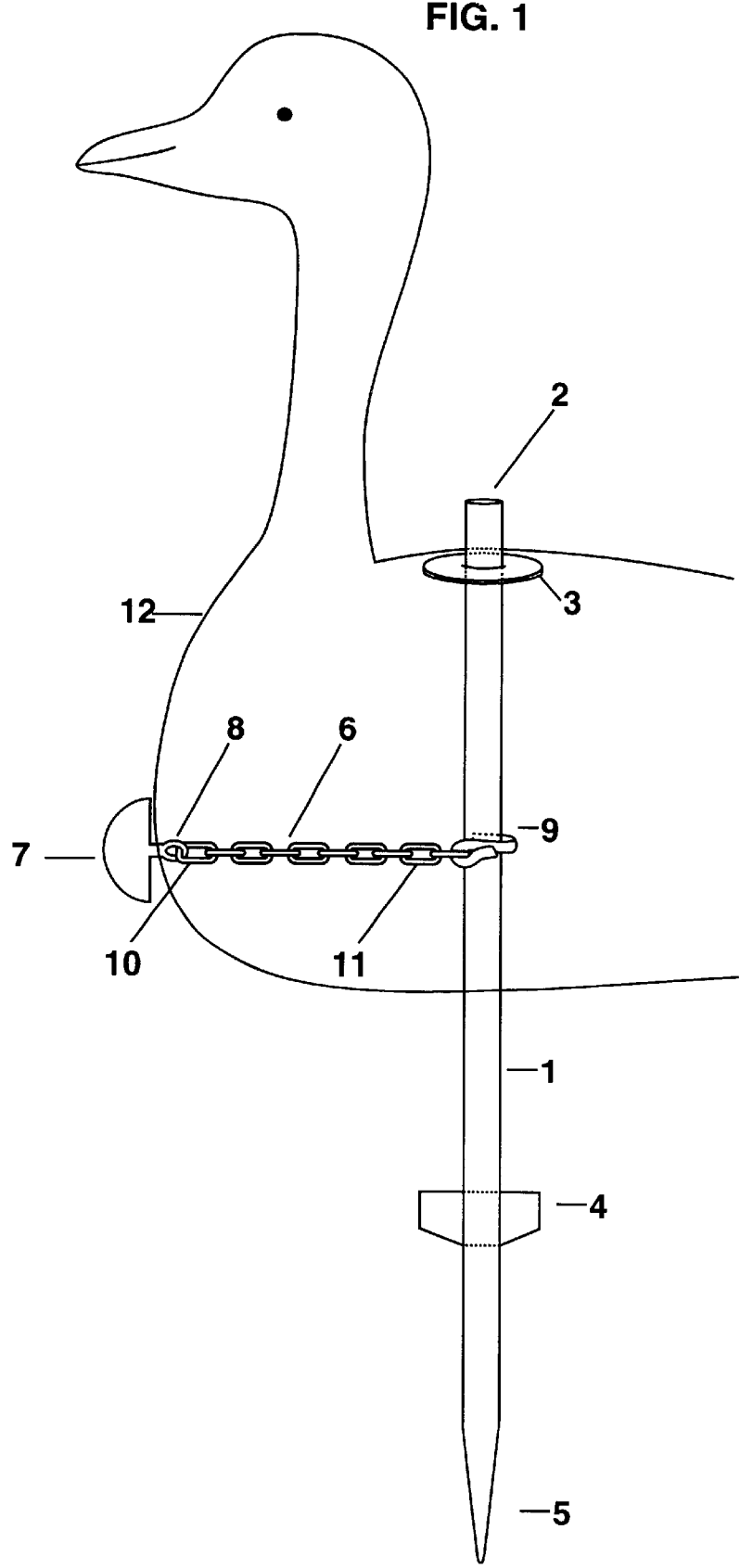
FIG. 1 is a side elevation of the assembled mounting, motion, and staking device in accordance with the present invention having a cutaway view of the front chest and head hole area of a mounted decoy thereon.
Figure 2:
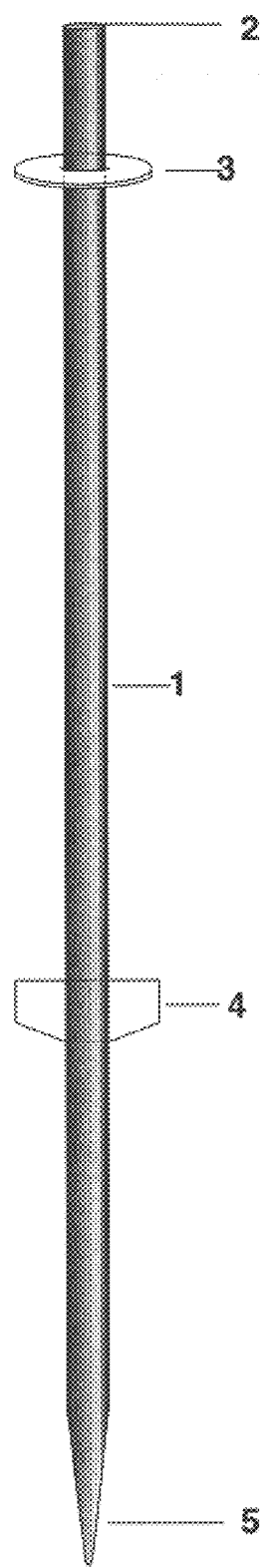
FIG. 2 is a top perspective of the mounting stake portion of the device.
Figure 3:
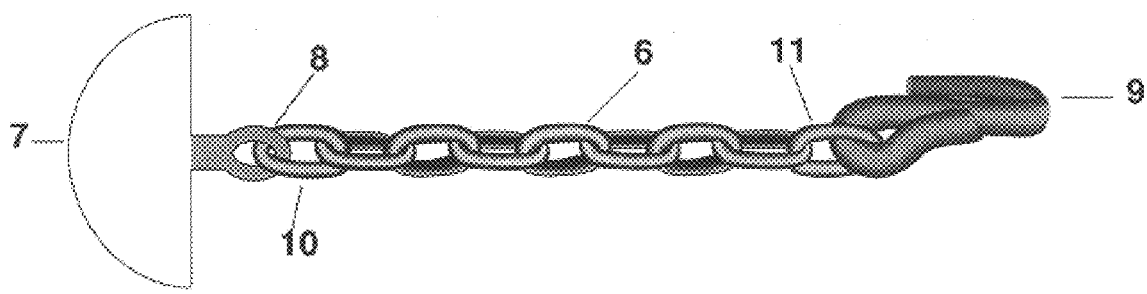
FIG. 3 is a side perspective of the connected sum of the three components of the adjustable tether fastening assembly portion of the device.
Figure 4:
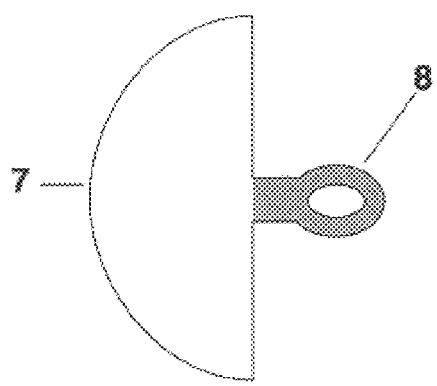
FIG. 4 is a side perspective of the separated mushroom shaped mounting button portion of FIG. 3 said button having a closed loop eye protrusion on its underside.
Figure 5:
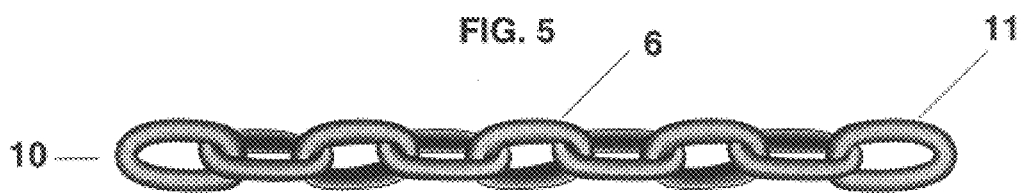
FIG. 5 is a side perspective of a separated view of the interlocking chain linkage portion of FIG. 3.
Figure 6:
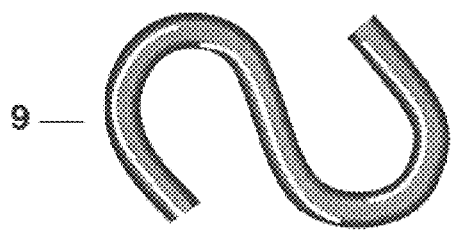
FIG. 6 is a side perspective of a separated view of the S hook portion of FIG. 3.

There are a number of manufacturers of half shell type decoys, each offering many different sizes and shapes. However, virtually all such decoys of a half-shell variety have some things in common in that each has a curved front chest area and a somewhat small flat area on its back immediately behind its neck. The present invention takes advantage of these common features and uses them as the two points of attachment of the decoy to the mounting, motion, and staking device.

The mounting, motion, and staking device is comprised of two primary components. The first is a mounting stake 1. The second is an adjustable tether fastening assembly 6 which is permanently attached to the decoy.

The mounting stake 1 has four primary functions. The first is to bear the weight of the mounted decoy 12 in an upright position. The second is to provide a bearing ledge 3 to support the weight of the decoy and on which the decoy can rotate in response to various horizontal and gravitational forces. The third is to provide a stop to prevent the mounted decoy 12 from sliding down the entire length of the mounting stake 1. Bearing ledge 3 acts as this stop. The fourth is to provide a ground wedge 4 to help maintain the vertical position of the assembly when driven into the ground during periods of extreme horizontal force.

The adjustable tether fastening assembly 6 has three primary functions. The first is to provide a second attachment point of decoy 12 to the mounting stake 1. The second is to act as an adjustment mechanism to allow the mounted decoy 12 to be brought into parallel alignment with the ground. The third is to maintain a constant length of attachment during periods of rotation.

Two modifications must be made to decoy 12 before mounting it to the mounting stake 1. First, the user must drill a hole in the top back portion of the decoy centered immediately behind its neck. A second hole must also be drilled in the lower front center chest area of the decoy 12 to which the tether fastening assembly 6 is attached.

The tether fastening assembly 6 is made up of three separate components. They are a mushroom shaped mounting button 7 having a closed loop eye protrusion 8 on its underside, a series of interlocking rings forming a chain 10–11, and an S hook 9. The adjustable tether fastening assembly 6 is assembled and connected to decoy 12 by inserting closed eye loop 8 of button head 7 through the front bottom drilled hole in the center chest of the decoy 12, next opening link 10 of the interlocking chain and threading it through closed eye loop 8 of button head 7, next crimping link 10 closed, and concluding by looping one end of S hook 9 through link 11 in the interlocking chain thus permanently attaching the assembled adjustable tether fastening assembly 6 to decoy 12.

In use, the bottom 5 portion of mounting stake 1 is driven into the ground to such a depth that support wedge 4 is covered. Decoy 12 is then secured to mounting stake 1 by first guiding its top hole over and through the upper end 2 portion of mounting stake 1 until it rests on bearing ledge 3 of mounting stake 1. The mounting process is concluded by looping the free S hook 9 end of adjustable tether fastening assembly 6 around the mid-between portion of mounting stake 1.

At this point, if the mounted decoy 12 is not in parallel alignment with the ground, the adjustable tether fastening assembly 6 should be shortened by one link by moving S hook 9 inward one link and then relooping it around mounting stake 1. This procedure is repeated until parallel alignment is achieved.

In use, the user can determine the facing direction to which the mounted decoy 12 will rotate by slightly tilting the mounting stake 1 by approximately five degrees in the opposite direction to that which is desired. This phenomenon occurs because of gravitational forces. With the decoy 12 mounted forward of its center mass, the preponderance of its weight is to its rear end. This rear weight distribution coupled with the slight tilting of the mounting stake 1 will always cause the mounted decoy 12 to face toward the opposite direction of the tilt when horizontal forces are absent. Thus, the user can always choose the facing direction which each decoy so mounted will assume under conditions absent any horizontal forces.

In use, various horizontal forces do come into play. Natural wind forces, manual forces, such as a jerk string, or mechanical forces, such as a battery powered device, will all easily cause the decoy to rotate when any of these horizontal forces are greater than the existing gravitational forces. Thus the user has many options, not only as to the determination of the at rest facing direction and position of each decoy, but also as to the individual movement, including direction and rotation, that each decoy will make in response to the various horizontal forces at work. Additionally, the response movement of the rotating decoy, when horizontal forces are reduced or eliminated, will always be a reverse directional movement toward the original at rest facing direction of the mounted decoy. This reverse directional movement is caused by the ever present force of gravity.

The foregoing description of the preferred embodiment of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A mounting, motion, and staking kit for decoys comprising:

a mounting assembly comprising a mounting stake and an adjustable tether fastening assembly having a mounting button, a chain, and an S-shaped hook;

said mounting stake having a bearing ledge positioned below an upper end thereof and a ground stabilizing wedge positioned above a lower end thereof, the bearing ledge having a diameter which is larger than a diameter of the mounting stake;

said mounting button having a rounded top surface defining a head and a generally flat bottom surface with a closed loop extending therefrom;

said chain having first and second ends and comprising a series of interconnected links;

whereby when the device is used with a decoy, the lower end of the mounting stake being insertable into the ground and the upper end being positionable through a hole in an upper portion of the decoy so that a lower inner surface of the decoy rests upon the bearing ledge, the closed loop of said mounting button being positionable through a lower hole in a central front chest area of the decoy, the first end of the chain being attachable to the closed loop, the S-shaped hook having one end being positionable around an intermediate portion of the mounting stake located between the bearing ledge and the ground stabilizing wedge and the other end being attachable to the second end of the chain, wherein the decoy is capable of rotating about the bearing ledge of the mounting stake and the fastening assembly is capable of rotating around the intermediate portion of the mounting stake along with the decoy.

2. A mounting, motion, and staking device in combination with a decoy, the combination comprising:

a decoy body with an upper hole through a central upper back area behind a head of the decoy body and a lower hole through a central front chest area of the decoy body;

a mounting assembly comprising a mounting stake and an adjustable tether fastening assembly having a mounting button, a chain, and an S-shaped hook;

said mounting stake having a bearing ledge positioned below an upper end thereof and a ground stabilizing wedge positioned above a lower end thereof, the bearing ledge having diameter which is larger than a diameter of the mounting stake;

said mounting button of said fastening assembly having a head with top and bottom surfaces and a closed loop extending from the bottom surface;

said chain having first and second ends and comprising a series of interconnected links;

said closed loop of said mounting button being positionable through the lower hole of the decoy body, said first end of the chain being attachable to the closed loop;

said lower end of the mounting stake being positionable in the ground and said upper end of the mounting stake being positionable through the upper hole of the decoy body so that a lower inner surface of the decoy body rests upon the bearing ledge;

said S-shaped hook having one end being positionable around an intermediate portion of the mounting stake located between said bearing ledge and said ground stabilizing wedge and the other end being attachable to the second end of the chain;

wherein the decoy body is capable of rotating about the bearing ledge of the mounting stake and the fastening assembly is capable of rotating around the intermediate portion of the mounting stake, thus allowing gravitational forces to determine a facing direction of the decoy body as determined by a direction of tilt of the mounting stake when the stake is mounted in the ground and when horizontal forces are absent and also allowing horizontal forces to rotate the decoy body when applied to the decoy body.

* * * * *